United States Patent
Brehm et al.

(10) Patent No.: US 10,766,187 B2
(45) Date of Patent: Sep. 8, 2020

(54) LAMINATE APPLICATOR

(71) Applicant: NORTHWEST AEROSPACE TECHNOLOGIES, INC., Everett, WA (US)

(72) Inventors: Nick Carroll Brehm, Everett, WA (US); Jason Bauer, Everett, WA (US)

(73) Assignee: NORTHWEST AEROSPACE TECHNOLOGIES, INC., Everett, WA (US)

( * ) Notice: Subject to any disclaimer, the term of this patent is extended or adjusted under 35 U.S.C. 154(b) by 883 days.

(21) Appl. No.: 15/154,783

(22) Filed: May 13, 2016

(65) Prior Publication Data
US 2016/0332435 A1 Nov. 17, 2016

Related U.S. Application Data

(60) Provisional application No. 62/162,338, filed on May 15, 2015.

(51) Int. Cl.
*B29C 63/00* (2006.01)
*B29L 31/30* (2006.01)

(52) U.S. Cl.
CPC ...... *B29C 63/0034* (2013.01); *B29C 63/0065* (2013.01); *B29L 2031/3005* (2013.01); *B29L 2031/3076* (2013.01)

(58) Field of Classification Search
CPC ............ B29C 63/0034; B29C 63/0039; B65H 45/221; B65H 45/22; B65H 45/223; B65H 45/225; B65H 37/06; B65C 1/04
See application file for complete search history.

(56) References Cited

U.S. PATENT DOCUMENTS

| | | | | |
|---|---|---|---|---|
| 1,491,784 A | * | 4/1924 | Boulton | B65H 45/22 493/438 |
| 2,401,103 A | * | 5/1946 | Preston | B65H 45/22 493/18 |
| 2,677,220 A | * | 5/1954 | Fischer | B65B 7/18 53/376.7 |
| 4,586,917 A | * | 5/1986 | Robinson | B42C 7/00 493/241 |
| 5,514,238 A | * | 5/1996 | Mauduit | B27D 5/003 156/201 |
| 6,488,792 B2 | * | 12/2002 | Mathieu | E04C 2/043 156/40 |
| 2007/0083879 A1 | * | 4/2007 | Burkart | G11B 7/0956 720/675 |
| 2010/0154984 A1 | * | 6/2010 | Robins | B29C 66/83411 156/227 |

(Continued)

*Primary Examiner* — Michael N Orlando
*Assistant Examiner* — Abhishek A Patwardhan
(74) *Attorney, Agent, or Firm* — Jeffer Mangels Butler & Mitchell LLP; Brennan C. Swain, Esq.

(57) ABSTRACT

A device for laminating panels that includes a base that includes an upper surface, a front edge and a rear edge, and a folding assembly that includes a first surface that is generally perpendicular with the upper surface of the base, a folding portion having an inner surface, a front edge and a rear edge. A folding path is defined from the front edge of the folding portion to the rear edge of the folding portion. An angle that is defined between the inner surface of the folding portion and the first surface decreases along the folding path.

14 Claims, 9 Drawing Sheets

(56) References Cited

U.S. PATENT DOCUMENTS

2010/0219224 A1* 9/2010 Yamamoto ............. B65H 23/28
226/1
2013/0025773 A1* 1/2013 Boggs ................... B29C 63/046
156/227

* cited by examiner

LAMINATE APPLICATOR

CROSS REFERENCE TO RELATED APPLICATIONS

This application claims the benefit of U.S. Provisional Application No. 62/162,338, filed May 15, 2015, which is incorporated by reference herein in its entirety.

FIELD OF THE INVENTION

The present invention relates generally to a laminate applicator, and more particularly to a machine for applying laminates to panels.

BACKGROUND OF THE INVENTION

Decorative laminates are often applied to panels. For example, in commercial aircraft, the interior panels typically include a decorative laminate thereon. The common process for applying the folded decorative laminate is using a heat gun to activate the adhesive on the folded edge of the decorative laminate, and then folding the laminate on the edges of the panel by hand.

The present invention replaces a time consuming manual method of applying and adhering the folded decorative laminate material onto the composite panel. It also helps reduce the amount of rework resulting from the manual process of heating and adhering the decorative laminate.

SUMMARY OF THE PREFERRED EMBODIMENTS

In accordance with a first aspect of the present invention there is provided a device for laminating panels that includes a base that includes an upper surface, a front edge and a rear edge, and a folding assembly that includes a first surface that is generally perpendicular with the upper surface of the base, a folding portion having an inner surface, a front edge and a rear edge. A folding path is defined from the front edge of the folding portion to the rear edge of the folding portion. An angle that is defined between the inner surface of the folding portion and the first surface decreases along the folding path. In a preferred embodiment, the angle that is defined between the inner surface of the folding portion and the first surface is about 90° at the rear edge of the folding portion. Preferably, the inner surface of the folding portion and the first surface are about co-planar at the front edge of the folding portion. Put another way, there is a first angle at the front of the folding assembly/folding portion and a second angle at the rear of the folding assembly/folding portion. The first angle is about 180° and the second angle is about 90° and the along the folding path the angle decreases gradually from 180° to 90°. Put yet another way, there is a first angle at the front of the folding assembly/folding portion and a fifth angle at the rear of the folding assembly/folding portion. The first angle is about 180° and the fifth angle is about 90°. Along the folding path there are second, third and fourth angles. Along the folding path, the second angle is less than the first angle, the third angle is less than the second angle, the fourth angle is less than the third angle, and the fifth angle is less than the fourth angle. The second angle can be, for example, 156°, the third angle can be, for example, 135°, and the fourth angle can be, for example, 123°.

In a preferred embodiment, the folding portion is heated. Preferably, the folding portion is heated by a heating strip that is attached to an outer surface thereof. In a preferred embodiment, the folding assembly includes a folding member secured to a guide rail and the folding member includes the folding portion and the guide rail includes the first surface thereon. Preferably, the folding member includes a mounting portion that is secured to an upper surface of the guide rail.

In a preferred embodiment, the device also includes a pressing assembly that is positioned rearwardly of the folding assembly along the folding path. Preferably, the pressing assembly includes a pressing member that is secured to an upper surface of the guide rail and the pressing assembly includes a lower surface that opposes the upper surface of the base. In a preferred embodiment, the pressing assembly is a roller assembly, and the folding path extends through the roller assembly.

In a preferred embodiment, the upper surface of the base includes a ramp portion that is adapted to receive a curved panel. In another preferred embodiment, the folding assembly does not extend longitudinally along the base. In other words, it can extend at an angle across the base or the folding assembly can be curved.

In accordance with another aspect of the present invention there is provided a device for laminating panels that includes a base that includes an upper surface, a front edge and a rear edge, and a folding assembly that includes a folding member secured to a guide rail. The folding member comprises a folding portion having an inner surface, a front edge and a rear edge and the guide rail comprises a first surface that is generally perpendicular with the upper surface of the base. A folding path is defined from the front edge of the folding portion to the rear edge of the folding portion, and an angle that is defined between the inner surface of the folding portion and the first surface decreases along the folding path. The angle that is defined between the inner surface of the folding portion and the first surface is about 90° at the rear edge of the folding portion, and the inner surface of the folding portion and the first surface are about co-planar at the front edge of the folding portion, wherein the folding portion is heated. For purposes of the claims, the front edge of the folding portion can be a point where the first surface is about co-planar to the inner surface of the folding portion. For example, the first surface may start at an angle that is greater than 180° with the first surface and then start decreasing. In this scenario, the front edge of the folding portion would be the point where the first surface is co-planar with the inner surface of the folding portion (i.e., where the angle between them is about 180°).

In a preferred embodiment, the device also includes a pressing assembly positioned rearwardly of the folding assembly along the folding path. Preferably, the pressing assembly includes a pressing member that is secured to an upper surface of the guide rail, and the pressing assembly includes a lower surface that opposes the upper surface of the base.

In accordance with another aspect of the present invention there is provided a method for laminating a panel using a device that includes a base that includes an upper surface, a front edge and a rear edge, and a folding assembly that includes a first surface that is generally perpendicular with the upper surface of the base, a folding portion having an inner surface, a front edge and a rear edge. A folding path is defined from the front edge of the folding portion to the rear edge of the folding portion, and an angle that is defined between the inner surface of the folding portion and the first surface decreases along the folding path. The method includes adhering a laminate to a bottom surface of the panel. The laminate includes a bottom surface, a top surface and at least one edge portion. The method also includes, positioning the bottom surface of the laminate on the upper surface of the base, folding the edge portion upwardly, positioning the edge portion against the first surface of the folding assembly, and moving the edge portion along the folding path, whereby at least a portion of the edge portion is adhered to a top surface of the panel. The edge portion is pushed downwardly by the folding portion as it is moved along the folding path. In a preferred embodiment, the method includes heating the folding portion. Preferably, the device includes a pressing assembly through which the folding path extends, and the method includes the step of moving the edge portion through the pressing assembly.

The present invention is directed to a laminate application device. The device can be used to apply a laminate to any panel. For example, the device can be used to apply decorative laminates to panels that are used in commercial aircraft and the like. The device is used to apply an adhesive fold to the decorative laminate on a composite panel using a controlled thermal application and a mechanical forming guide curve or folding assembly to produce a secure fold and adhesion to complete the decorative laminate application to a composite panel.

The device includes two components to complete the process of an adhesive fold to a composite panel. The first part of the process is to achieve the correct thermal properties that prepare the adhesive on the laminate in a manner that is suitable for application to the composite panel. A temperature controlled ribbon element (referred to herein as the rear heater) is used to conduct heat to a steel frame and steel guide table. Then, the heat is conducted to the composite panel. The second step in the process involves mechanically folding and applying the decorative laminate to the composite panel using a mechanical forming folding member.

BRIEF DESCRIPTION OF THE DRAWINGS

Like numerals refer to like parts throughout the several views of the drawings.

DETAILED DESCRIPTION OF THE PREFERRED EMBODIMENTS

Figure 1:
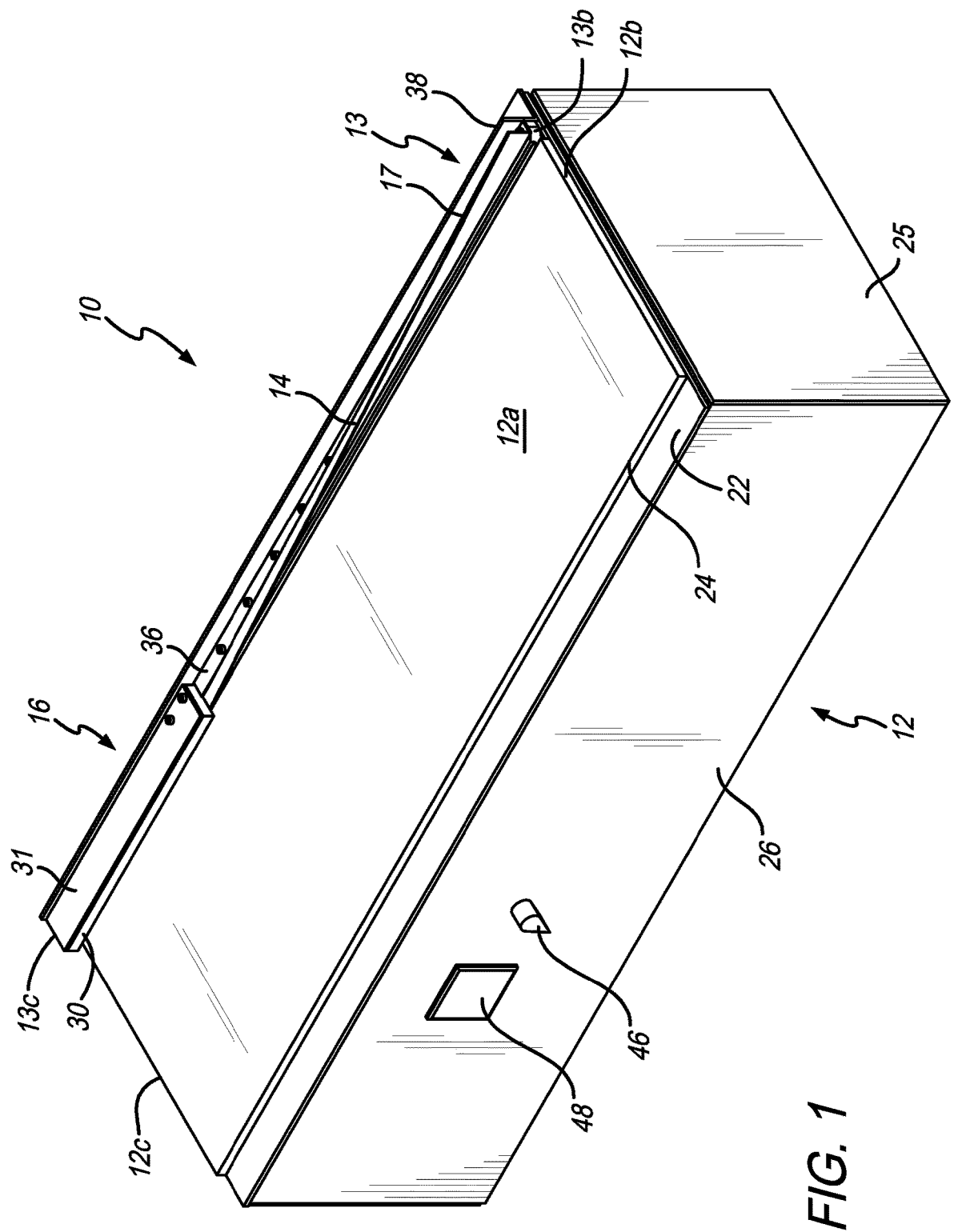
FIG. 1 is a perspective view of a laminate application device in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

The present invention is a device for applying laminates to a panel and is referred to herein as a laminate application device 10. The device 10 can be used to apply a laminate to any panel. However, in an exemplary embodiment of the present invention, the device 10 is used to apply decorative laminates 100 to panels 102 that are used in commercial aircraft and the like. However, this is not intended to be a limitation on the present invention.

Figure 2:
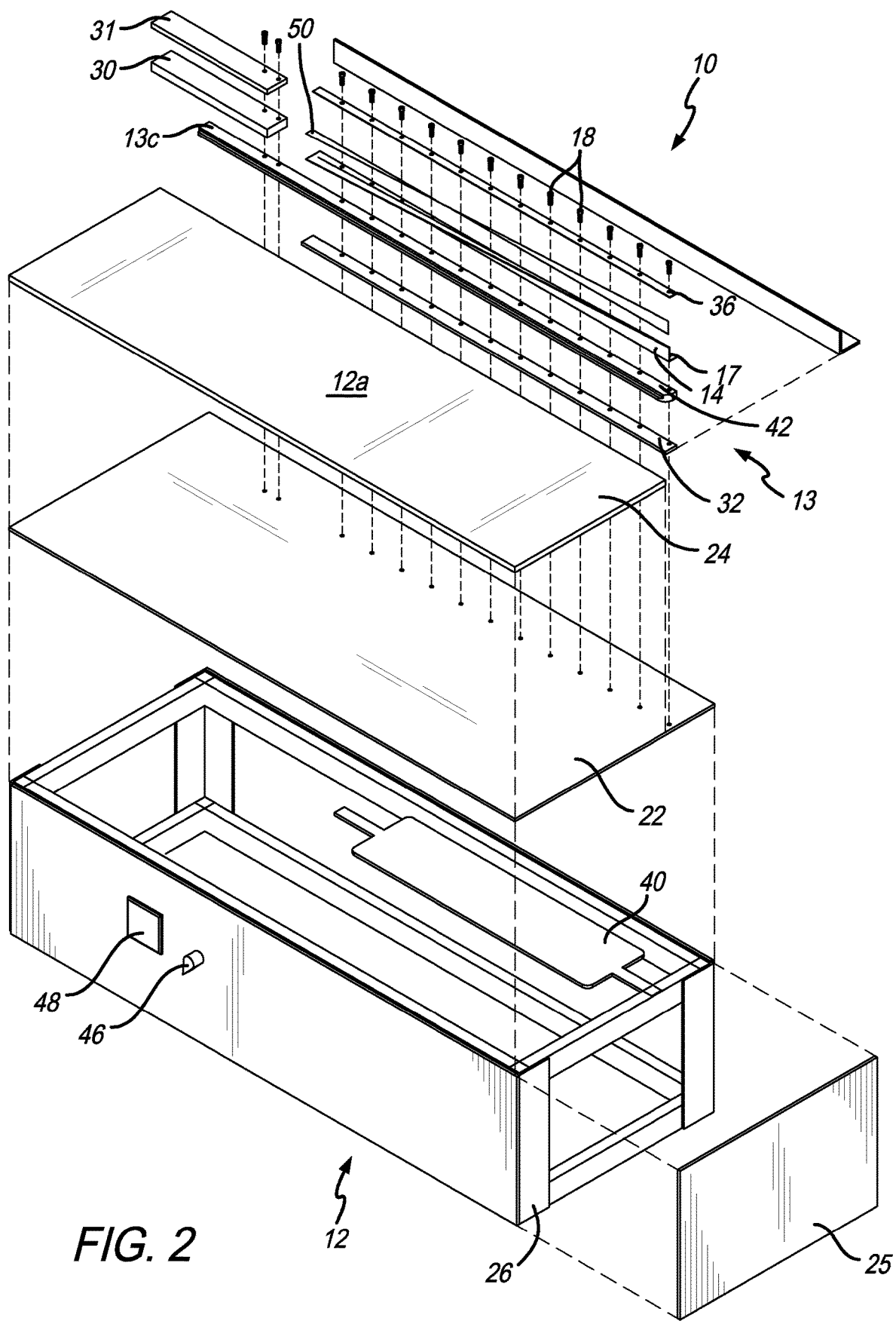
FIG. 2 is an exploded perspective view of the laminate application device of FIG. 1.
Figure 3:
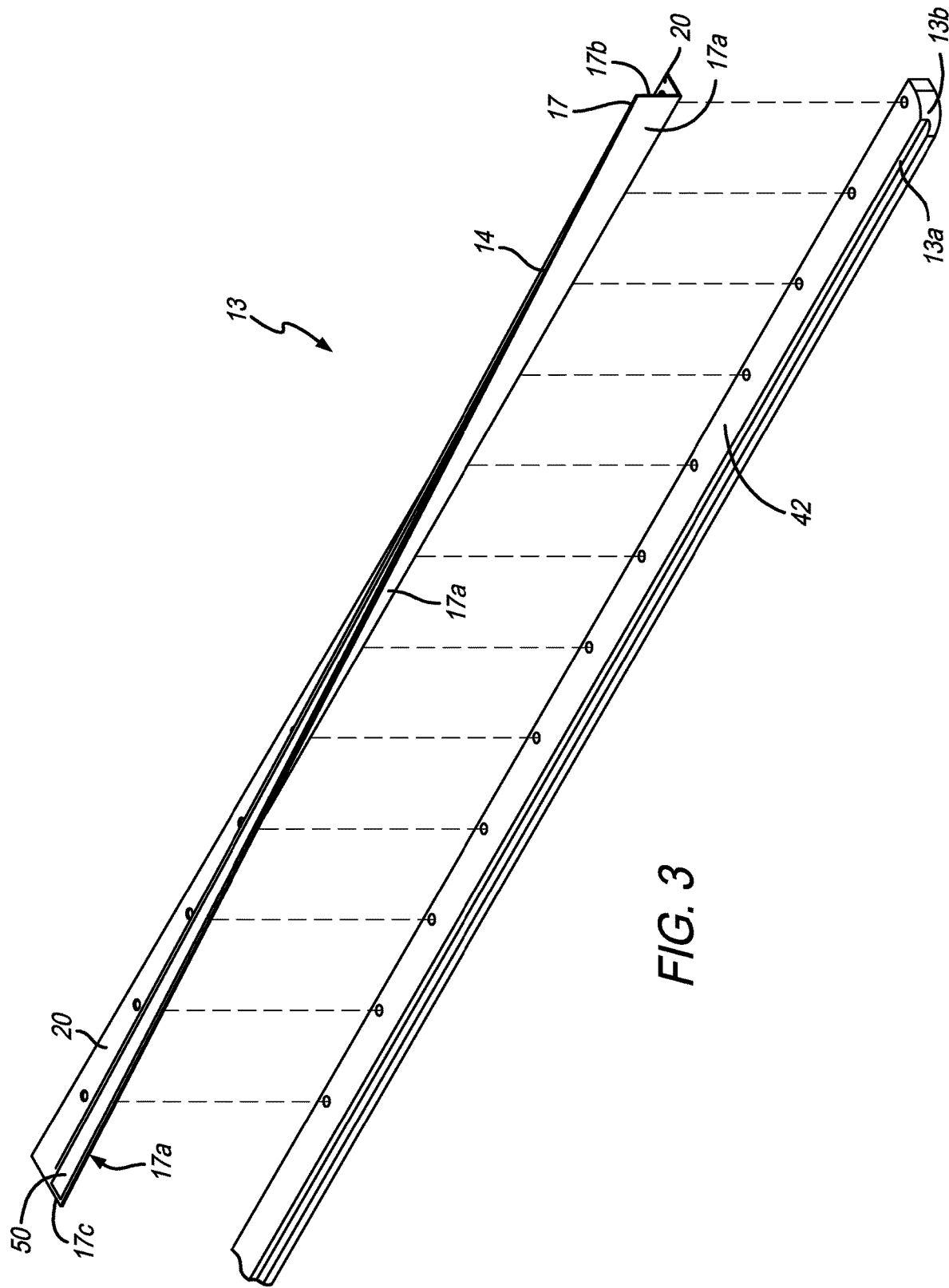
FIG. 3 is a an exploded perspective view of the guide rail and the folding member.
Figure 4:
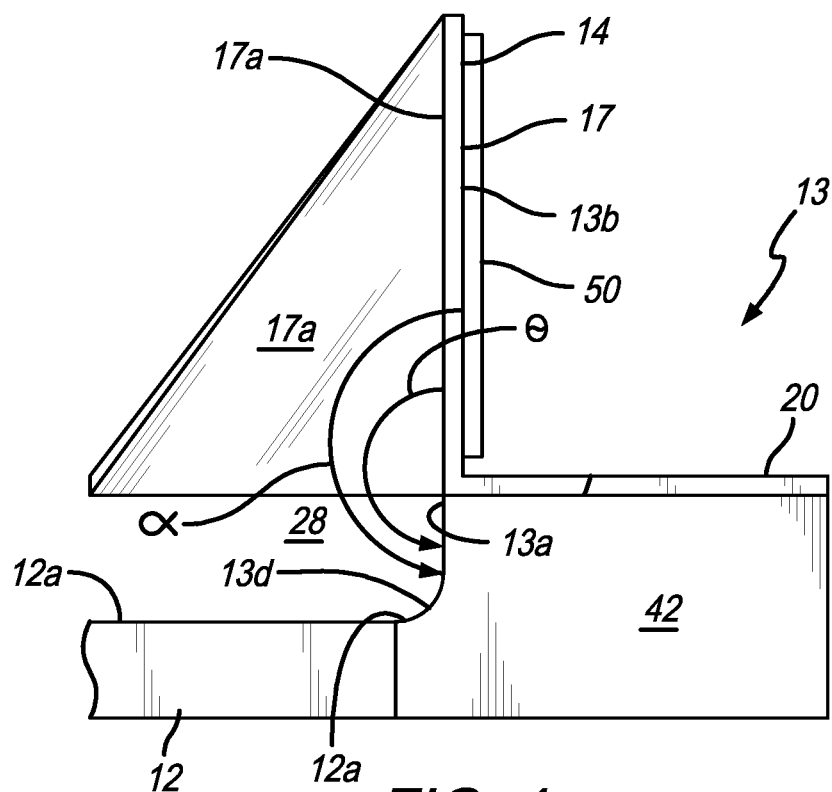
FIG. 4 is a front end elevational view of the guide rail and the folding member.
Figure 5:
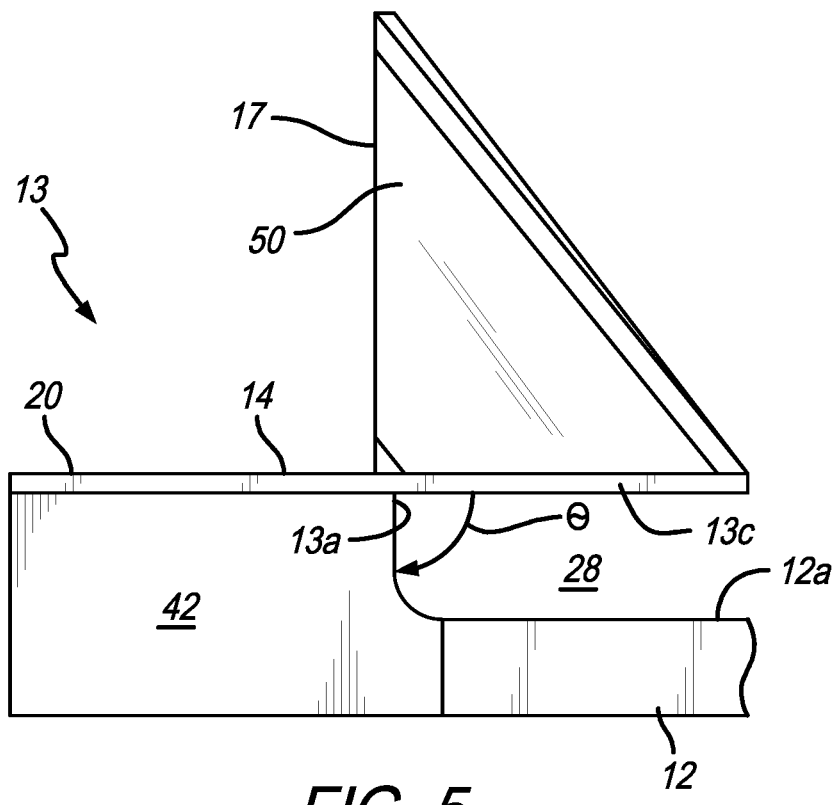
FIG. 5 is a rear end elevational view of the guide rail and the folding member.

As shown in FIGS. 1-2, generally, the device 10 includes a base 12, a folding assembly 13 and a pressing assembly 16. The base 12 includes an upper surface 12a, a front edge 12b and a rear edge 12c. As shown in FIGS. 3-5, the folding assembly 13 includes a first surface 13a that is generally perpendicular with the upper surface 12a of the base 12, a front edge 13b, a rear edge 13c, and a folding portion 17 having an inner surface 17a, a front edge 17b and a rear edge 17c. A folding path FP (see FIG. 6) is defined from the front edge 13b to the rear edge 13c of the folding assembly 13 (and from the front edge 17b to the rear edge 17c of the folding portion 17). It should be understood that in some embodiments, the device 10 includes a pressing assembly 16. In the embodiments where a pressing assembly is included the folding path extends through the folding portion and the pressing assembly. In an embodiment where the pressing assembly is omitted, the folding path only extends through the folding portion. This is why rear edge 13c is shown in two different locations in FIG. 2.

An angle θ is defined between the inner surface 17a of the folding portion 17 and the first surface 13a. Angle θ decreases along the folding path FP from the front to the back. In other words, the angle θ that is defined between the inner surface 17a of the folding portion 17 and the first surface 13a (or the upper surface 12a of the base 12) decreases as a panel 102 (see FIG. 7) is moved rearwardly away from the front of the device 10 toward the back of the device 10, as described more fully below.

Figure 7:
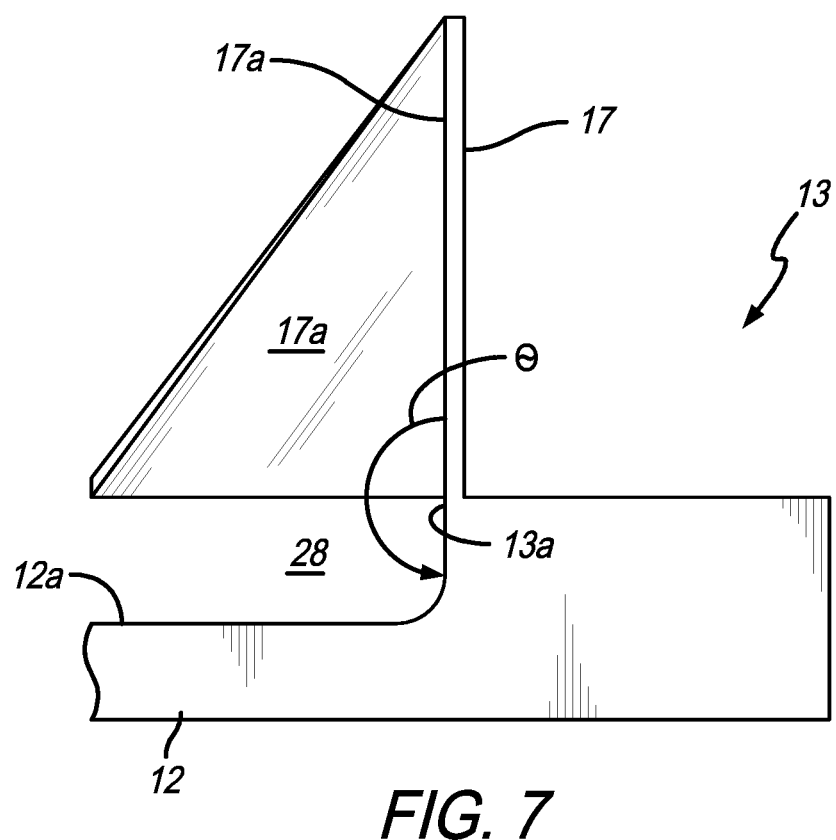
FIG. 7 is a front end elevational view of a unitary folding assembly.

In a preferred embodiment, as shown in FIG. 3, the folding assembly 13 includes a folding member 14 and a guide rail 42 that are secured together by bolts 18 (see FIG. 2). In this embodiment, the first surface 13a is part of the guide rail 42 and the folding portion 17 is part of the folding member 14. Preferably, at least a portion of the upper surface 12a is also part of the guide rail 42 (as shown in FIG. 4). As shown in FIGS. 4 and 5, a curved surface 13d extends between upper surface 12a and first surface 13a. However, the curved surface can be omitted. In another embodiment, the folding assembly 13 can be a unitary piece. In yet another embodiment, the folding assembly 13 can be unitary with the base 12, as shown in FIG. 7.

In the embodiment shown in FIG. 3, the folding member 14 includes the folding portion 17 and a mounting portion 20 that extends from the folding portion 17 and includes openings therein for receiving the bolts 18 to attach the folding assembly 13 to the base 12. As shown in FIG. 4, in a preferred embodiment, the inner surface 17a of the folding portion 17 and the first surface 13a are generally co-planar at the front edge 13b of the folding assembly 13. In the embodiment shown in FIG. 4, the first surface 13a and the inner surface 17a of the folding portion 17 are generally perpendicular to the upper surface 12a and the angle θ between the first surface 13a and the inner surface 17a is about 0°. However, in another embodiment, the folding portion 17 can start beyond co-planar (angled to the right in FIG. 4) or less than co-planar (angled to the left in FIG. 4). In other words, the folding portion 17 can form an angle with the upper surface 12a that is greater than 90° or less than 90°.

As shown in FIG. 5, at the rear edge 13c of the folding assembly 13, the angle θ that is defined between the inner surface 17a of the folding portion 17 and the first surface 13a is about 90°. Therefore, the angle θ between the inner surface 17a of the folding portion 17 and the first surface 13a goes from 180° at a point adjacent the front edge 13b to 90° at a point adjacent the rear edge 13c. As shown in FIG. 4, the folding portion 17 folds downwardly, thereby continuously decreasing angle θ between the front edge 13b and the rear edge 13c (or front edge 17b and rear edge 17c). It will be appreciated that the folding portion 17 may not always form a straight angle with the first surface 13a, but may include a slight curvature to it to help fold the edge portion 104 of the laminate 100 downwardly toward the panel 102, as shown in FIG. 4.

The folding assembly 13 defines a portion of a channel 28 that extends from the front edge 13b of the folding assembly 13 to the rear edge 13c, and through the pressing assembly 16. The fold path FP extends through the channel 28. As shown in FIG. 5, the channel 28 is defined by upper surface 12a, first surface 13a and inner surface 17a. The front end of the channel 28 receives the edge of a panel 102. In use, the panel 102 is placed against the first surface 13a so that the loose edge of the laminated is against the folding portion 17. Then, as the panel is fed along the upper surface 12a, the folding portion 17 folds or curves downwardly to a point where it includes a generally horizontal section 17d (see FIG. 5). After the panel is moved along the fold path FP and the edge portion 104 of the laminate 102 is attached to the panel 100, the panel then enters the portion of the channel 28 that is in the pressing assembly 16.

As shown in FIGS. 2 and 7, the pressing assembly 16 includes a pressing member 30 that includes a lower surface 30a that opposes upper surface 12 (and partially defines channel 28). The pressing member 30 is secured on top of the guide rail 42. In a preferred embodiment, the pressing member 30 is heated by a heater 31 that is secured to an upper surface of the pressing member. The channel 28 is dimensioned so that the lower surface 30a places pressure on the edge portion 104 and helps it adhere to the panel 100. In another embodiment, the pressing member 30 and folding assembly 13 can be unitary. In this embodiment, the generally horizontal section 17d of the folding portion 17 extends further. The folding path FP extends through the channel 28 and through the pressing assembly 16. In an embodiment, the pressing member 30 can be adjustable upwardly and downwardly.

As shown in FIGS. 1-2, in a preferred embodiment, the base 12 includes a slide plate 24, a base plate 22 and a frame 26. The slide plate 24 includes upper surface 12a that is flush with the guide rail 42. The base plate can be omitted. Preferably, the frame 26 includes plates or panels therearound (e.g., end plate 25). In a preferred embodiment, the device 10 can also include a guide rail shim 32 that extends under the guide rail 42 and raises the guide rail 42 to the proper level so that the upper surface 12a on the slide plate 24 is flush with the upper surface 12a of the folding assembly 13/guide rail 42. The folding assembly 13 is secured to the base 12 by threaded fasteners or bolts 18 that extend through openings in an upper plate 36, the folding member 14, the guide rail 42 and the guide rail shim 32. In another embodiment, these components can be secured together by welding, adhesive or other method. Preferably, the device also includes an angle bracket 38 positioned behind the guide rail 42 to hold the folding assembly 13 and pressing assembly 16 in place and to conduct heat.

In a preferred embodiment, the device is heated so that the adhesive used to adhere the laminate 100 to the panel 102 is properly melted or otherwise affected. Many of the components are metal, so the heater can be located anywhere and then conducted through the metal components as necessary. In a preferred embodiment, as shown in FIG. 2, a front heating strip 40 is positioned under the base plate 22. The heating strip 40 heats up the base plate 22, which transfers heat to the guide rail 42, pressing assembly 16, pressing member 30, folding member 14, guide rail shim 32 and other necessary components. The heating strip 40 is controlled by front controller 46, shown in FIGS. 1 and 2. A rear heater strip 50 (see FIGS. 3 and 5) is also preferably included. The rear heater strip 50 is attached to, extends along at least a portion of and heats the folding portion 17. The rear heater strip 50 defines a rear heater strip angle α, as shown in FIG. 4. Rear controller 48 controls rear heater strip 50.

Figure 6:
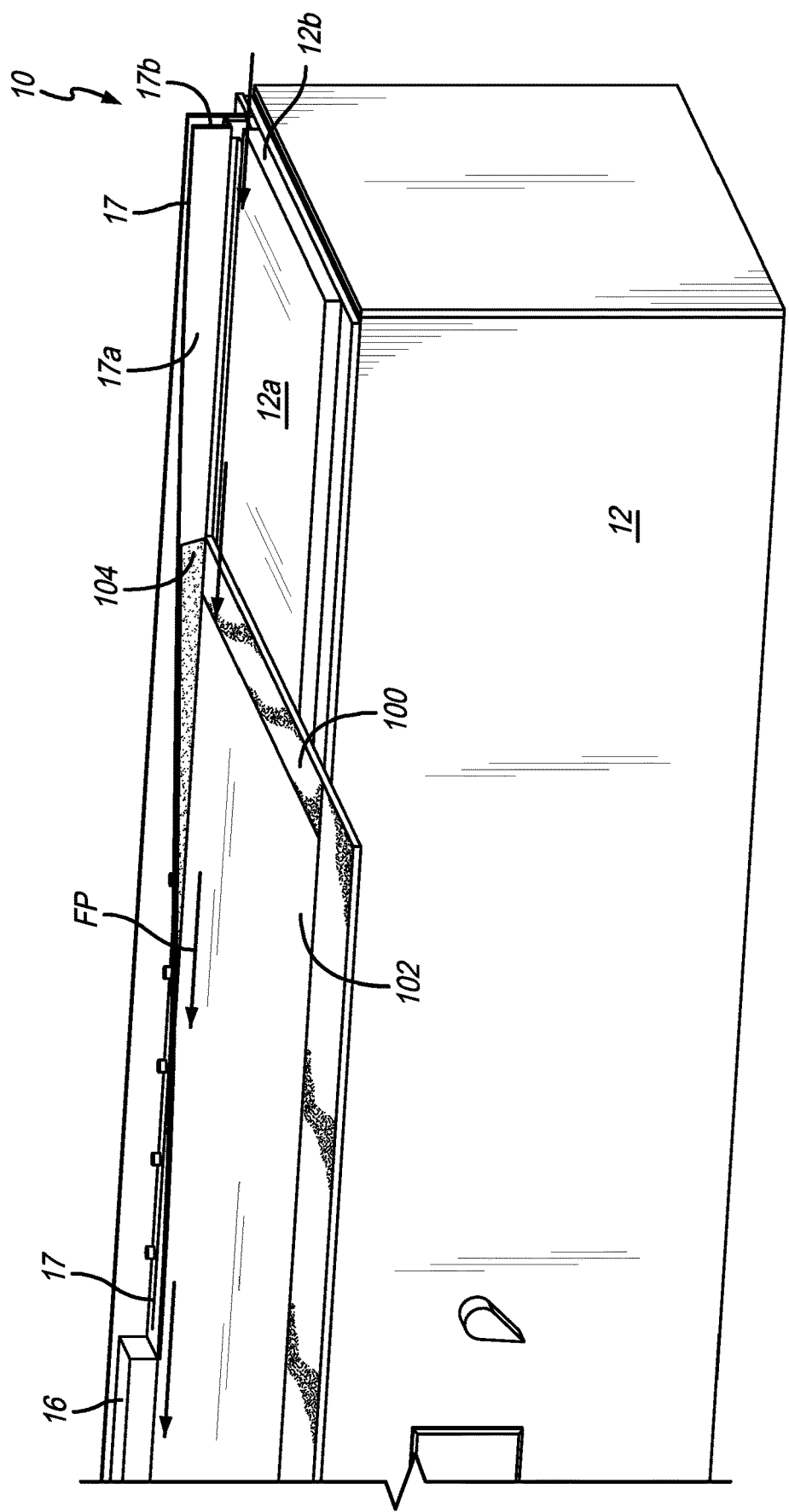
FIG. 6 is a perspective view of the laminate application device with a laminate being applied to a panel therein.

In use (as shown in FIG. 6), a panel 102 with a decorative laminate 100 positioned thereon, is inserted into the front end of channel 26 with a first edge against the first surface 13*a*. At this point, the edge portion 104 of the decorative laminate 100 is sticking up in a generally vertical direction. The panel 102 is then pushed along the upper surface 12*a* of slide plate 24 with the edge in channel 26. The edge is moving along the fold path FP. As it moves along the path, the folding portion 17 pushes or folds the edge portion 104 of decorative laminate 100 down onto the panel 102 (as a result of decreasing angle θ). Because the folding portion 17 and other components are heated, the decorative laminate 100 is adhered to the panel 102 (due to adhesive being pre-applied to the laminate and/or the panel). As the panel moves through the pressing assembly 16, the pressing member 30 presses the edge portion 104 of the laminate 100 against the panel 102 further adhering the two together. This process is then repeated for the remaining three edges of the panel 102.

Figure 8:
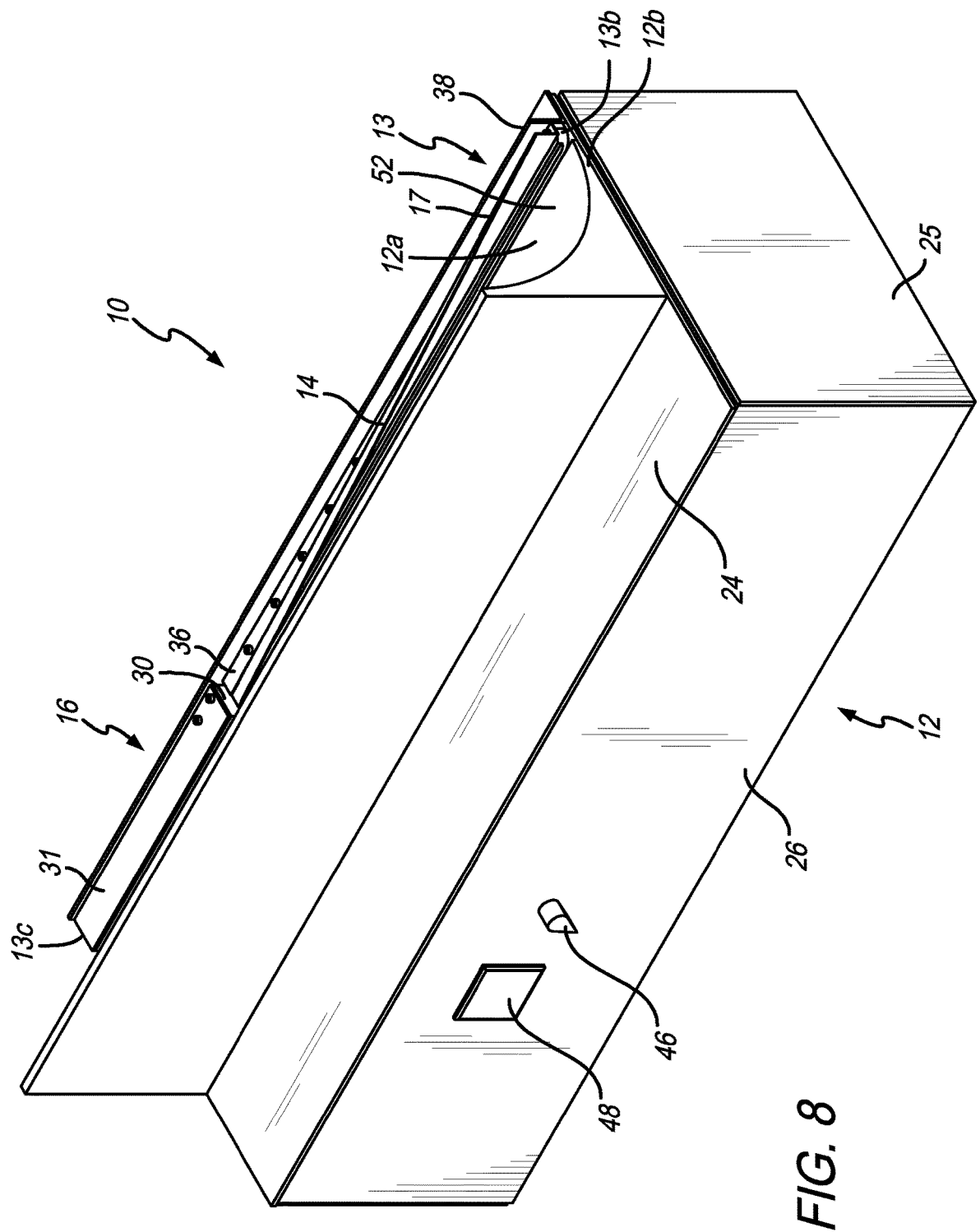
FIG. 8 is a perspective view of a laminate application device for applying laminates to curved panels in accordance with another preferred embodiment of the present invention.

FIG. 8 shows another preferred embodiment of the present invention used for adhering a laminate to a curved panel. In this embodiment, the upper surface 12*a* of the base 12 includes a ramp portion 52 that is adapted to receive the curved panel. The ramp portion 15 can be unitary with the base 12 and/or slide plate 24 or the ramp portion 52 can be a separate piece that is secured to the base 12 and/or slide plate 24. In a preferred embodiment, the ramp portion 52 is a separate component that can be used when a curved panel is laminated and removed so flat panels can be laminated.

Figure 9:
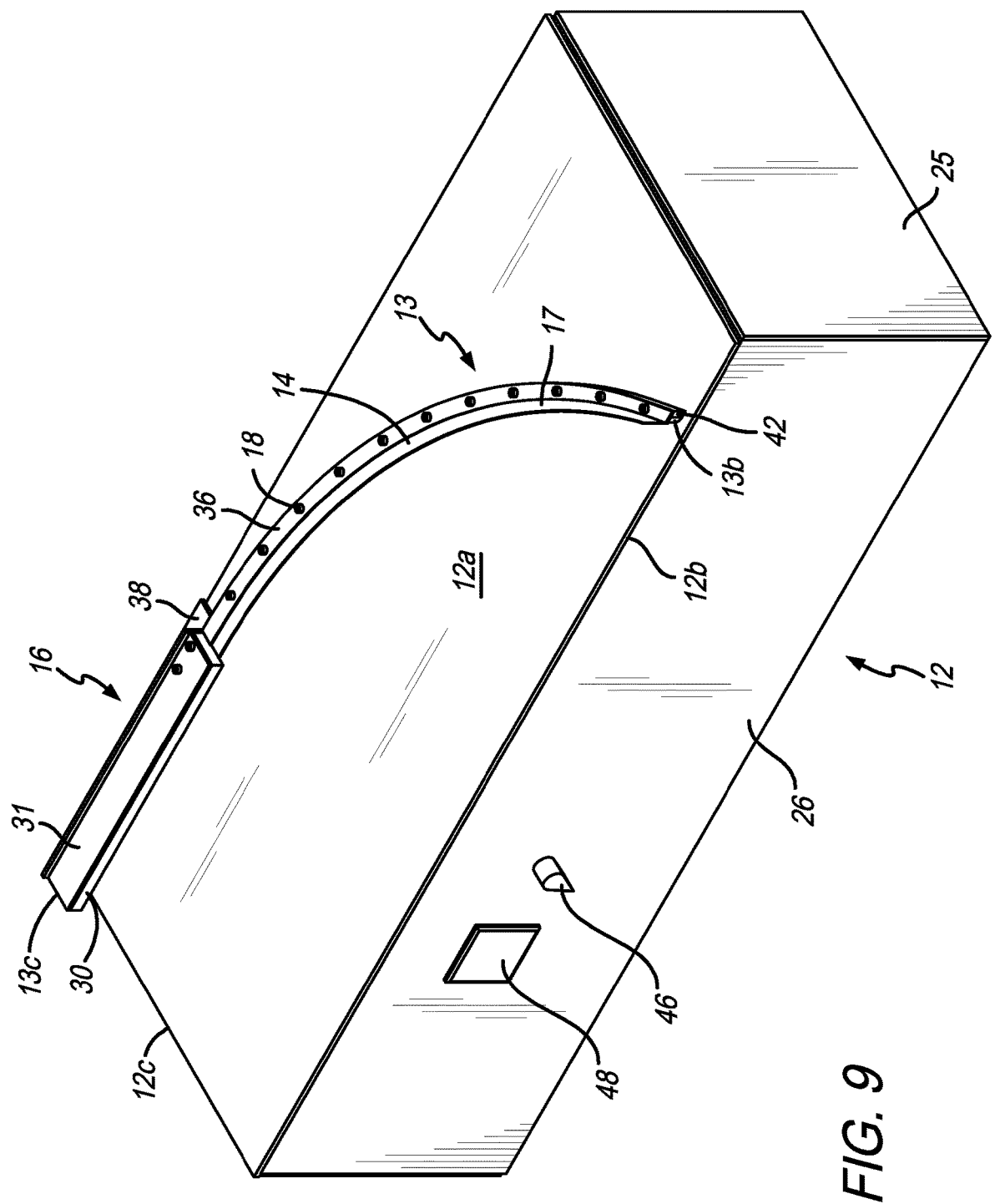
FIG. 9 is a perspective view of a laminate application device for applying laminates to panels with curved edges in accordance with another preferred embodiment of the present invention.

FIG. 9 shows another preferred embodiment of the present invention used for adhering a laminate to a panel with a curved edge. In this embodiment, the folding assembly 13 is curved. The guide rail 42 and folding member 14 are both curved.

Figure 10:
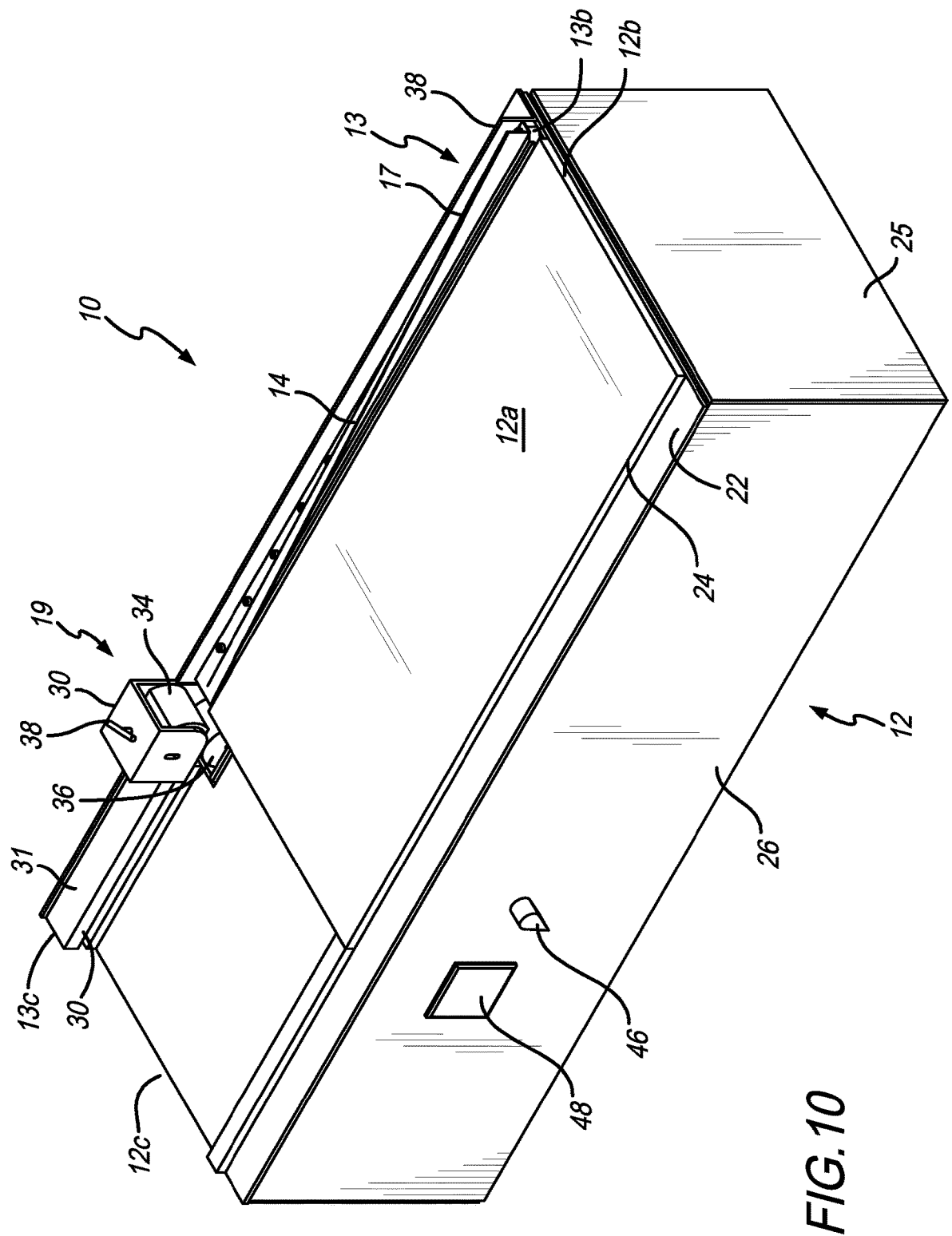
FIG. 10 is a perspective view of a laminate application device with a roller assembly in accordance with another preferred embodiment of the present invention.

As shown in FIG. 10, in another embodiment, the pressing assembly is a roller assembly 19 that includes a roller housing frame 30 that houses top and bottom rollers 34 and 36 and a T-handle 38. The top and bottom rollers define a portion of channel 26 therebetween. The T-handle 38 provides adjustability of the height of top roller 34. This provides the ability to run different thickness panels through the device 10. In use, the T-handle 38 is threaded and can be turned clockwise or counter-clockwise to move it up or down to put pressure on the laminate 100, depending on the size of the panel 102 or the laminate 100 being run through the device 10. In another embodiment the bottom roller can also be adjustable.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A device for adhering a laminate to a panel, the device comprising:
    a base that includes an upper surface, a front edge and a rear edge, and
    a folding assembly that includes a first surface that is generally perpendicular with the upper surface of the base, a folding portion having an inner surface, a front edge and a rear edge, wherein the folding portion is heated by a rear heater strip having a front surface that it directly attached to a rear surface of the folding portion, such that the laminate is adhered to the panel,
    wherein a folding path is defined from the front edge of the folding portion to the rear edge of the folding portion, and
    wherein a first angle that is defined between the inner surface of the folding portion and the first surface decreases along the folding path, wherein the front surface of the rear heater strip defines a rear heater strip angle with the first surface, wherein the rear heater strip angle decreases along the folding path, wherein the rear heater strip angle is the same as the first angle along the entire folding path.

2. The device of claim 1 wherein the first angle is about 90° at the rear edge of the folding portion.

3. The device of claim 2 wherein the inner surface of the folding portion and the first surface are about co-planar at the front edge of the folding portion.

4. The device of claim 1 wherein the folding assembly includes a folding member secured to a guide rail, wherein the folding member comprises a mounting portion and the folding portion, wherein the folding portion extends upwardly from and is generally perpendicular to the mounting portion at the front edge of the folding portion, wherein the guide rail comprises the first surface and an upper surface, wherein a lower surface of the mounting portion of the folding member is in contact with and secured to the upper surface of the guide rail.

5. The device of claim 1 further comprising a pressing assembly positioned rearwardly of the folding assembly along the folding path.

6. The device of claim 5 wherein the pressing assembly includes a pressing member that is secured to an upper surface of the guide rail, wherein the pressing assembly includes a lower surface that opposes the upper surface of the base, and wherein the pressing member is heated by a heater that is secured to an upper surface of the pressing member.

7. The device of claim 5 wherein the pressing assembly is a roller assembly that includes at least one of an upper roller and a lower roller, and wherein the folding path extends through the roller assembly.

8. The device of claim 1 wherein the upper surface of the base includes a ramp portion that is adapted to receive a curved panel.

9. The device of claim 1 wherein the base defines a longitudinal axis, and wherein the folding assembly does not extend parallel to the longitudinal axis.

10. The device of claim 9 wherein the folding assembly is curved with respect to the longitudinal axis.

11. A device for laminating panels, the device comprising:
    a base that includes an upper surface, a front edge and a rear edge, and
    a folding assembly that includes a folding member secured to a guide rail,
    wherein the folding member comprises a folding portion having an inner surface, a front edge and a rear edge and the guide rail comprises a first surface that is generally perpendicular with the upper surface of the base,
    wherein a folding path is defined from the front edge of the folding portion to the rear edge of the folding portion,
    wherein a first angle that is defined between the inner surface of the folding portion and the first surface decreases along the folding path,
    wherein the first angle is about 90° at the rear edge of the folding portion,
    wherein the inner surface of the folding portion and the first surface are about co-planar at the front edge of the folding portion, and
    wherein the folding portion is heated by a rear heater strip that is directly attached to a rear surface of the folding portion, wherein the rear heater strip defines a rear heater strip angle with the first surface, wherein the rear heater strip angle decreases along the folding path, and wherein the rear heater strip angle is the same as the first angle along the entire folding path.

12. The device of claim 11 further comprising a pressing assembly positioned rearwardly of the folding assembly along the folding path.

13. The device of claim 12 wherein the pressing assembly includes a pressing member that is secured to an upper surface of the guide rail, and wherein the pressing assembly includes a lower surface that opposes the upper surface of the base.

14. The device of claim 1 wherein the base includes a base plate, wherein the base plate comprises the upper surface of the base, and wherein a front heating strip is positioned under the base plate to heat the upper surface.

* * * * *